United States Patent [19]

Funabiki et al.

[11] 4,066,588
[45] Jan. 3, 1978

[54] COLD-CURING BINDER FOR FOUNDRY SAND CORES AND MOLDS

[75] Inventors: Kyohei Funabiki; Noriaki Matsushima; Toshiyuki Tachikawa; Kazuichi Ikeda, all of Fujieda, Japan

[73] Assignee: Sumitomo Durez Company, Ltd., Tokyo, Japan

[21] Appl. No.: 727,327

[22] Filed: Sept. 27, 1976

[30] Foreign Application Priority Data

Oct. 3, 1975 Japan .................................. 50-118805

[51] Int. Cl.$^2$ ........................ B22C 1/22; C08G 63/48; C08G 71/04
[52] U.S. Cl. ............................... 260/22 TN; 164/43; 260/33.6 UB; 260/DIG. 40
[58] Field of Search .................. 260/22 TN, DIG. 40; 164/43

[56] References Cited

U.S. PATENT DOCUMENTS

| 3,179,990 | 4/1965 | Freeman | 164/43 |
| 3,255,500 | 6/1966 | Engel et al. | 164/43 |
| 3,385,345 | 5/1968 | Miraldi | 164/43 |
| 3,426,831 | 2/1969 | Robins et al. | 164/43 |

OTHER PUBLICATIONS

Patton, Alkyd Resin Technology Formulating Techniques and Allied Calculations, Interscience Publishers, 1962, p. 175.

Primary Examiner—Ronald W. Griffin
Attorney, Agent, or Firm—Peter F. Casella; James F. Mudd; William G. Gosz

[57] ABSTRACT

A cold-curing binder for foundry sand cores and molds comprises (a) an oil-modified alkyd resin, said resin characterized by an oil component which comprises a mixture of tall oil fatty acid and linseed oil in the ratio of from about 20:80 to about 80:20 parts by weight, (b) a polyisocyanate component, and (c) a curing accelerator. The novel binders of this invention generate less objectionable odor during the casting operation and cure more rapidly than conventional binders.

14 Claims, No Drawings

COLD-CURING BINDER FOR FOUNDRY SAND CORES AND MOLDS

BACKGROUND OF THE INVENTION

This invention relates to cold-curing foundry sand binders, i.e., binders which cure at about ambient temperature. The binders for manufacturing foundry cores and molds of the type capable of self-curing at ambient temperatures are classified into inorganic binders, which have acquired traditional commercial acceptance, and organic binders, which have been gaining in commercial acceptance in recent years.

The organic binders generally cure by polycondensation of the resin accompanied by the simultaneous formation of water. The water formed during the polycondensation reaction impedes the progress of the cure, and consequently, the rate of cure differs widely between the surface and the inner part of the core or mold. Therefore, when a large core or mold is manufactured, much time is required before the core or mold is ready for removal from the pattern. The use of a strong acid, such as sulfuric acid, has been proposed as an effective means of increasing the rate of cure. This method, however, is not suitable for the manufacture of large cores or molds due to a decrease in the useful life of the resin composite. Moreover, this method requires the use of additional procedures, such as, for example, applying heat to the silica sand in order to maintain a fixed temperature throughout the year despite seasonal variations in ambient temperatures.

A binder for the manufacture of cores or molds which overcomes the problem of nonuniform cure of the core or mold, colloquially referred to as the "Lino-cure Process," has been commercially introduced into Japan. According to common practice, the binder for the manufacture of cores and molds comprises an oil-modified alkyd resin, a polyisocyanate, and a curing accelerator. The core or mold is produced by mixing silica sand with these components to form a silica sand-binder mixture, and molding the mixture into a pattern.

U.S. Pat. No. 3,255,500, to Engel et al., discloses admixtures of oil-modified alkyd resins and polyisocyanates as no-bake binders for foundry compositions. Engel et al. discloses various oils as components of the oil-modified alkyd resin employed therein, including tall oil, linseed oil, and mixtures thereof. Engel et al. do not, however, recognize the potentiated effects occurring through the selection of specific proportions of ingredients which are essential to the instant invention. More particularly, the proportions of tall oil fatty acid to linseed oil of the instant invention, when employed as the oil component of the oil-modified alkyd resin, provide significantly faster curing of the mold and generate considerably less objectionable odor than other proportions included within the broad sweep of the disclosed combination of ingredients.

As is true for conventional binders, this process possesses several advantages including good collapsibility of the cores or molds after casting, reusability of recovered sand, and fewer process steps in the finishing process. Furthermore, this process is more advantageous than methods utilizing furfuryl alcohol-modified resins in the sense that removal of the core or mold from the pattern can be attained within a shorter period of time. This characteristic of permitting a relatively short pattern residence time has caused this process to rapidly gain in commercial acceptance in recent years.

SUMMARY OF THE INVENTION

The present invention relates to cold-curing binders for foundry sand cores and molds, i.e., binders which cure at about ambient temperature, and to the molds and cores produced therefrom. According to this invention, the binders comprise a tall oil fatty acid-modified alkyd resin having, as the oil component, a mixture of tall oil fatty acid and linseed oil in a weight proportion of tall oil fatty acid to linseed oil in the range of from about 20:80 to about 80:20, a polyisocyanate, and a curing accelerator. Optimum results are obtained when the weight proportion of tall oil fatty acid to linseed oil is in the range of from about 50:50 to about 70:30, and the tall oil fatty acid comprises at least about 90% fatty acid.

DESCRIPTION OF THE INVENTION

The instant invention relates to a cold-curing binder which comprises a tall oil fatty acid-modified alkyd resin, using a major proportion of tall oil and a minor proportion of linseed oil, a polyisocyanate as a curing agent, and a curing accelerator such as a metal salt of an organic acid. Furthermore, use of tall oil fatty acid provides a resin which is in stable supply, and permits more efficient use of natural resources by allowing reclamation of waste materials. This binder has been found to possess substantially better curing properties, and give off less objectionable odor when pouring molten metal, than the Lino-cure Process binder. The components of the tall oil fatty acid-modified alkyd resin, and the procedure for its manufacture, may now be described as follows:

1. A polybasic acid component, such as polycarboxylic acids such as maleic acid, isophthalic acid, and anhydrides of polycarboxylic acids, such as phthalic anhydride, 2. A polyhydric alcohol component, such as glycerin, pentaaerythritol, trimethylol propane, and so forth, and, 3. An oil component, comprising a mixture of linseed oil and tall oil fatty acid. The ratio of the tall oil fatty acid and the linseed oil is in the range of from about 20:80 to about 80:20, and preferably from about 50:50 to about 70:30 respectively. When the tall oil fatty acid alone is used as the oil component, the resin solution becomes heterogeneous and, as such, fails to make a satisfactory binder for the manufacture of cores and molds. When the ratio of the tall oil fatty acid and the linseed oil is 80:20, the resin solution becomes uniform and, therefore, produces a core or mold which gives off less objectionable odor during the pouring of molten metal and provides good curing behavior. When this ratio is reversed to 20:80, the generation of objectionable odor during the pouring of molten metal, and the curing properties of the mold, are less favorable. Consequently, the most favorable results are obtained using mixtures of tall oil fatty acid and linseed oil in the preferred range of from about 50:50 to about 70:30.

The alkyd resin is generally obtained by allowing linseed oil and glycerin to react with each other at 200° C for 30 minutes, in the presence of a small amount of caustic potash, which serves as a catalyst, and thereafter allowing the reaction to proceed at 180° C, in the presence of added isophthalic acid, until the acid number reaches a fixed level. When ordinary tall oil is used, in whole or in part, in place of the linseed oil in this reaction, the resin solution subsequently obtained shows a lower initial strength during the production of the core or mold, and gives a lower final strength, than the resin solution obtained by using linseed oil alone. A possible reason for this is that tall oil is a mixture of a fatty acid and a resin acid, and the resin acid which forms part of the tall oil impedes rather than contributes to the curing of the resin binder. In the present invention we have succeeded in obtaining a binder which cures rapidly by using the tall oil fatty acid present in tall oil.

Tall oil is an oily by-product comprising fatty acids and resin acids obtained from waste liquids during the production of sulfate pulp or soda pulp. On distillation, the tall oil produces tall oil fatty acid, tall oil rosin, and tall oil pitch.

For purposes of this invention, the term "tall oil fatty acid" is intended to include a tall oil as above-described wherein the major proportion of said tall oil is the tall oil fatty acid component. It has been found, unexpectedly, that the effectiveness of the binders of this invention increases with increasing fatty acid content of the tall oil. In particular, it has been found that the best results are obtained with a fatty acid content exceeding about 90%. Where not otherwise specified, the tall oil should have an acid number of more than about 180, and an iodine number of more than about 100.

The tall oil fatty acid-modified alkyd resin produced by mixing the tall oil fatty acid with linseed oil has been found to give off less objectionable odor during the pouring of molten metal, and to exhibit better curing properties than a resin solution produced from linseed oil alone. In contrast, a resin modified with tall oil fatty acid alone was found unsatisfactory as a binder.

As described previously, the tall oil fatty acid-modified alkyd resin of the present invention is produced by mixing a tall oil fatty acid, linseed oil, a polyhydric alcohol, and a polybasic acid with an esterification catalyst, allowing the reactants to undergo an inter-esterification reaction by ordinary methods, and thereafter dissolving the inter-esterification product with an organic solvent. The concentration of this solution should exceed 40%. It is however preferable for the concentration to exceed about 60% to preclude generation of objectionable odors from the solvent, migration of the solvent to the wooded pattern, and low cure rates of the resin. The solvents which are advantageous for this purpose are aromatic solvents such as benzene, toluene, xylene, etc. or aliphatic solvents such as n-heptane, mineral spirits, etc. Mixtures of these solvents may also be used.

The polyisocyanates which are used advantageously in the present invention are those which have at least two isocyanate groups per molecule. Examples are polyisocyanates such as polymethylene polyphenylpolyisocyanate, para-phenylene-diisocyanate, 2,4-toluene-diisocyanate, 2,6-toluene-diisocyanate, 1,5-naphthalene-diisocyanate, hexamethylene-diisocyanate, xylene-diisocyanate, etc., and mixtures of these polyisocyanates.

The amount of the polyisocyanate to be added is in the range of from about 5 to about 40%, preferably from about 10 to about 30%, based on the weight of resin solution. If the added amount is less than 5%, the reaction of the polyisocyanate with the active hydrogen present in the resin solution will be incomplete, and the final strength of the core or mold obtained will be extremely low. If the added amount exceeds 40%, the reaction of the polyisocyanate with the resin solution proceeds so rapidly that it leaves no time for filling the pattern with the molding composite.

As an accelerating agent for the cure of the resin solution and the polyisocyanate, a metal salt of naphthenic acid, a metal salt of octoic acid, stannous chloride, tri-n-butyltin acetate, dibutyltin laurate, and so forth, which are generally used as catalysts for the reaction of urethane, may be used either singly or in combination as a mixture.

The amount of the curing accelerator to be used is from about 0.5 to about 20%, preferably from about 1 to about 10%, based on the weight of resin solution. This amount may be varied with ambient temperature, pattern drawing time from the core or mold, and the like.

Following is a description of the standard operation for producing a foundry core or mold which involves the use of the alkyd resin, the polyisocyanate, and the curing accelerator of the present invention.

Silica sand is first mixed with the resin solution and the curing accelerator, and subsequently with the polyisocyanate, and the resultant mixture is kneaded until a homogeneous mixture is obtained. This mixing may be carried out by using a batch or continous mixer, for example, by a speed muller or a whirl mixer. Although the amounts of the individual components to be added vary with the size of the core or mold being produced, generally the amount of the resin solution present is in the range of from about 0.5 to about 2.0%, based on the weight of silica sand, the amount of the polyisocyanate present is in the range of from about 5 to about 40%, based on the weight of resin solution, and the amount of the curing accelerator is in the range of from about 0.5 to about 20%, based on the weight of resin solution. The mold or core produced by using this binder is such that, after the molten metal has been cast, the mold or core block can be crushed finely and the finely divided particles can be re-used as recovered sand. As recovery of sand may be thus repeated, the amount of the resin to be incorporated may be gradually decreased. With repeated use of the recovered sand and the gradual decrease in the amount of resin incorporated, the binder of the present invention not only permits saving in silica sand, but also cuts the running cost of the casting operation.

The following examples are presented to illustrate and explain more particularly the present invention, but it should be understood that the present invention is not limited thereby. The "parts" and "percentages" indicated in the specification and claims are by weight unless otherwise specified.

EXAMPLE 1

A flask provided with an agitator, a thermometer and a vacuum outlet was charged with 200 g of linseed oil, 650 g of a tall oil fatty acid (having a resin acid content of 40% and a tall oil fatty acid content of 45%) and 350 g of glycerin. With 5 g of caustic potash added as a catalyst, the reactants in the flask were allowed to react at 200° C. for 1 hour. After that, with 300 g of isophthalic acid added thereto, the reaction was continued until the acid number reached the range of from 10 to 15. The resultant reaction product was mixed with mineral turpentine to produce a tall oil-modified alkyd resin having a solid content of 70%. The resin showed a viscosity of 23 poises (at 25° C.) and proved to be unsuitable in terms of workability unless the resin content was lowered.

EXAMPLE 2

A resin solution was prepared by the procedure of Example 1, except 840 g of a tall oil fatty acid (having a tall oil fatty acid content of 94%) was used as the oil component. The resin solution produced was a clear solution when the resin solution temperature was from 60° to 70° C., but when the temperature fell below 40° C., the resin component segregated so as to make the solution no longer usable.

EXAMPLE 3

The same flask as used in Example 1 was charged with 170 g of linseed oil and 680 g of a tall oil fatty acid (having a tall oil fatty acid content of 94%) and subsequently with 350 g of glycerin and 5 g of caustic potash. The mixture was reacted at 200° C. for 1 hour. After that, with 300 g of isophthalic acid added thereto, reaction was continued at 180° C. until the acid number reached the range of from 10 to 15. The reaction product was diluted with mineral turpentine so as to have a solid content of 70%.

EXAMPLE 4

The same flask as used in Example 1 was charged with 250 g of linseed oil and 600 g of a tall oil fatty acid (having a tall oil fatty acid content of 94%) and subsequently with 350 g of glycerin and 5 g of caustic potash. The reactants were heated at 200° C for 1 hour. After that, with 320 g of isophthalic acid added thereto, the reaction was continued at 180° C. until the acid number reached the range of from 10 to 15. The resultant reaction product was diluted with mineral turpentine so as to have a solid content of 70%.

EXAMPLE 5

The same flask as used in Example 1 was charged with 425 g of linseed oil and 425 g of a tall oil fatty acid (having a tall oil fatty acid content of 94%) and subsequently with 350 g of glycerin and 5 g of caustic potash. The reactants were heated at 200° C for 1 hour. After that, with 350 g isophthalic acid added thereto, the reaction was continued at 180° C. until the acid number reached the range of from 10 to 15. The reaction product was diluted with mineral turpentine so as to have a solid content of 70%.

EXAMPLE 6

The same flask as used in Example 1 was charged with 680 g of linseed oil and 170 g of a tall oil fatty acid (having a tall oil fatty acid content of 94%) and subsequently with 350 g of glycerin and 5 g of caustic potash. The reactants were allowed to react at 200° C. for 1 hour. After that, with 380 g of isophthalic acid added thereto, the reaction was continued at 180° C. until the acid number reached the range of from 10 to 15. The reaction product was diluted with mineral turpentine so as to have a solid content of 70%.

EXAMPLE 7

The procedure of Example 4 was repeated by using the same mixing ratios of components and the same reaction conditions, except the tall oil fatty acid used was of a type having a tall oil fatty acid content of 91%.

EXAMPLE 8

The procedure of Example 4 was repeated by using the same mixing ratios of components and the same particulars of the reactions, except the tall oil fatty acid used was of a type having a tall oil fatty acid content of 85%.

COMPARATIVE EXAMPLE

The same flask as used in Example 1 was charged with 850 g of linseed oil and 350 g of glycerin and subsequently with 5 g of caustic potash as the catalyst. The reactants were allowed to react at 200° C. for 30 mintes. After that, with 400 g of isophthalic acid added thereto, the reaction was continued at 180° C. until the acid number reached the range of from 10 to 15. After the acid number had reached the specified range, the reaction product was diluted with mineral turpentine so as to produce a resin solution having a solid content of 70%.

EXAMPLE 9

Each of the resin solutions prepared in Examples 1 through 7 and the Comparative Example was mixed with silica sand in a small whirl mixer. The mixture was converted into a self-curing foundry sand by incorporation of a polyisocyanate and a metal salt of naphthenic acid. The self-curing foundry sand was immediately molded in a wooden pattern measuring 50 mm in height and 50 mm in diameter and then left standing. After that, the mold was tested for compressive strength, curing properties, and the degree of objectionable odor emitted during the pouring of molten metal. The results were as shown in Table 1. The composition of the self-curing foundry sand was shown below:

| | |
|---|---|
| Flattery silica sand | 100 parts |
| Resin solution | 1.2 parts |
| Polymethylene polyphenyl polyisocyanate (NCO content 30%) | 0.24 part |
| Cobalt naphthenate | 0.065 part |

Table 1

| | | Properties of self-curing foundry sand composition | | | | | | | | |
|---|---|---|---|---|---|---|---|---|---|---|
| Example No. | | 1 | 2 | 3 | 4 | 5 | 6 | 7 | 8 | Comparative Example |
| Fatty acid of tall oil (%) | | 45 | 94 | 94 | 94 | 94 | 94 | 91 | 85 | — |
| Ratio of linseed oil to tall oil fatty acid used | | 200/650 (24:76) | 0/840 (0:100) | 170/680 (20:80) | 250/600 (29:71) | 425/425 (50:50) | 680/170 (80:20) | 250/600 (29:71) | 250/600 (29:71) | 850/0 (100:0) |
| | Standing Time | | | | | | | | | |
| Compressive Strength (kg/cm$^2$) | 30 Minutes | — | | 0.8 | 1.8 | 0.9 | — | 1.1 | — | — |
| | 1 Hour | — | | 3.1 | 8.2 | 6.5 | 3.1 | 7.9 | 3.3 | 2.4 |
| | 3 HOurs | 36 | not moldable | 15.8 | 20.3 | 16.4 | 13.5 | 21.5 | 15.1 | 12.7 |
| | 5 Hours | 20.9 | | 43.1 | 39.8 | 38.7 | 36.9 | 37.1 | 34.3 | 40.1 |
| | 24 Hours | 39.8 | | 51.6 | 54.2 | 53.1 | 55.8 | 52.6 | 56.8 | 56.3 |
| * Cure time of deep portion (min.) | | 200 | | 77 | 51 | 63 | 97 | 59 | 84 | 105 |

* Objectionable odor emitted during the

Table 1-continued

| Example No. | Properties of self-curing foundry sand composition | | | | | | | | Comparative Example |
|---|---|---|---|---|---|---|---|---|---|
| | 1 | 2 | 3 | 4 | 5 | 6 | 7 | 8 | |
| pouring of molten metal | 3 | | 3 | 3 | 3 | 3-4 | 3 | 3 | 4 |

Note:
* Cure time of deep portion: This represents the interval between the time a glass rod was pushed into a given molding piece, which was manually pressed in a cup immediately after being mixed in a muller, and the time said glass rod became immovable under hand pressure. This length of time is a standard measure of the pattern drawing time.
** Objectionable odor emitted during the pouring of molten metal:
The odor was rated on the six-grade scale as indicated below:
0 — Total absence of objectionable odor
1 — Barely discernible objectionable odor
2 — Easily discernible objectionable odor
3 — Definitely discernible objectional odor
4 — Heavily objectionable odor
5 — Unbearably objectionable odor Table 1 demonstrates the effects of employing preferred ranges of proportions of ingredients, and increased fatty acid content of the tall oil fatty acid component, on the cure time and odor levels. The relative effectiveness of the tall oil fatty acid content can be seen by comparing the results of the measured curing time of Examples 7 and 8. Similarly, the relative effectiveness of our preferred ranges of proportions of ingredients is clearly demonstrated by the excellent curing times recorded in Examples 4, 5 and 7.

When the tall oil fatty acid-modified alkyd resin, according to the present invention, was used as a binder for foundry cores and molds, the binder showed excellent curing behavior. The mold or core obtained by using this binder produced cast articles having smooth surfaces, and the collapsibility of the mold or core after casting was good. Further, recovery of sand was good and contributed greatly to economizing natural resources. Due to the use of tall oil fatty acid, the resins of the present invention are in stable supply, natural resources are conserved, and cost economies are maintained.

We claim:

1. A cold-curing binder for foundry sand cores and molds which comprises:
   a. a tall oil fatty acid-modified alkyd resin prepared from components comprising a polybasic acid, a polyhydric alcohol, and a mixture of tall oil fatty acid, having a fatty acid content of at least about 90%, and linseed oil in a weight proportion of tall oil fatty acid to linseed oil in the range of from about 50:50 to about 70:30,
   b. a polyisocyanate, present in the amount of about 5 to about 40 percent by weight of resin, and
   c. a curing accelerator.

2. The binder of claim 1 wherein the polybasic acid comprises polycarboxylic acids and anhydrides of polycarboxylic acids.

3. The binder of claim 2 wherein the polybasic acid is selected from the group consisting of maleic acid, isophthalic acid, phthalic anhydride and mixtures thereof.

4. The binder of claim 1 wherein the polyhydric alcohol is selected from the group consisting of glycerin, pentaerythritol, trimethylol propane and mixtures thereof.

5. The binder of claim 1 wherein the tall oil fatty acid has an acid number of at least about 180.

6. The binder of claim 1 which includes an organic solvent for said resin.

7. The binder of claim 6 wherein the organic solvent is selected from the group consisting of aromatic solvents, aliphatic solvents and mixtures thereof.

8. The binder of claim 7 wherein the solvent is selected from the group consisting of benzene, toluene, xylene, n-heptane, mineral spirits and mixtures thereof.

9. The binder of claim 1 wherein the polyisocyanate is selected from the group consisting of polymethylene polyphenyl-polyisocyanate, para-phenylene-diisocyanate, 2,4-toluene-diisocyanate, 2,6-toluene-diisocyanate, 1,5-naphthalene-diisocyanate, hexamethylene-diisocyanate, xylene-diisocyanate and mixtures thereof.

10. The binder of claim 1 wherein the curing accelerator is selected from the group consisting of a metal salt of naphthenic acid, a metal salt of octoic acid, stannous chloride, tri-n-butyltin acetate, or dibutyltin laurate and mixtures thereof.

11. The binder of claim 1 wherein the isocyanate is present in the range of about 10 to about 30 percent by weight of resin.

12. The binder of claim 1 wherein the curing accelerator is present in the range of from about 0.5 to about 20 percent by weight of resin.

13. The binder of claim 12 wherein the curing accelerator is present in the range of from about 1 to about 10 percent by weight of resin.

14. A foundry sand mold comprising silica sand, and the cold-curing binder of claim 1.

* * * * *